United States Patent
Willmore

[11] Patent Number: 5,537,120
[45] Date of Patent: Jul. 16, 1996

[54] MAIN LOBE SHIFTING MEANS

[75] Inventor: Robert R. Willmore, Millersville, Md.

[73] Assignee: The United States of America as represented by the Secretary of the Air Force, Washington, D.C.

[21] Appl. No.: 520,110

[22] Filed: Aug. 4, 1983

[51] Int. Cl.⁶ .................................................. G01S 7/38
[52] U.S. Cl. ...................................... 342/15; 342/200
[58] Field of Search .......................... 343/18 E; 342/15, 342/200

[56] References Cited

U.S. PATENT DOCUMENTS

| | | | |
|---|---|---|---|
| 3,662,386 | 5/1972 | Bryant | 343/18 E X |
| 4,017,856 | 4/1977 | Wiegand | 343/18 E |
| 4,050,070 | 9/1977 | Beno et al. | 343/18 E X |
| 4,146,892 | 3/1979 | Overman et al. | 343/18 E |
| 4,247,946 | 1/1981 | Mawhinney | 343/18 E X |
| 4,328,496 | 5/1982 | White | 343/18 E |
| 4,396,917 | 8/1983 | Tucker | 343/18 E |
| 4,496,949 | 1/1985 | Bettini et al. | 343/18 E X |
| 4,823,139 | 4/1989 | Eisner et al. | 342/15 |
| 4,890,109 | 12/1989 | Gagliardi | 342/14 |
| 4,990,920 | 2/1991 | Sanders, Jr. | 342/14 |
| 5,153,594 | 10/1992 | Moffat | 342/15 |
| 5,463,396 | 10/1995 | Lewis | 342/15 |

Primary Examiner—John B. Sotomayor
Attorney, Agent, or Firm—William G. Auton

[57] ABSTRACT

Improved performance in electronic countermeasure systems that utilize main lobe shifting techniques to jam track while scan threat radars are achieved through the use of a modulation sweep program that overcomes scan rate frequency and phase uncertainties. The modulation sweep program is used in conjunction with a conventional swept repeater modulation program. The modulation sweep program is disabled and the swept repeater modulation program is enabled when constant illumination sources or track while scan saturation conditions are encountered.

1 Claim, 10 Drawing Sheets

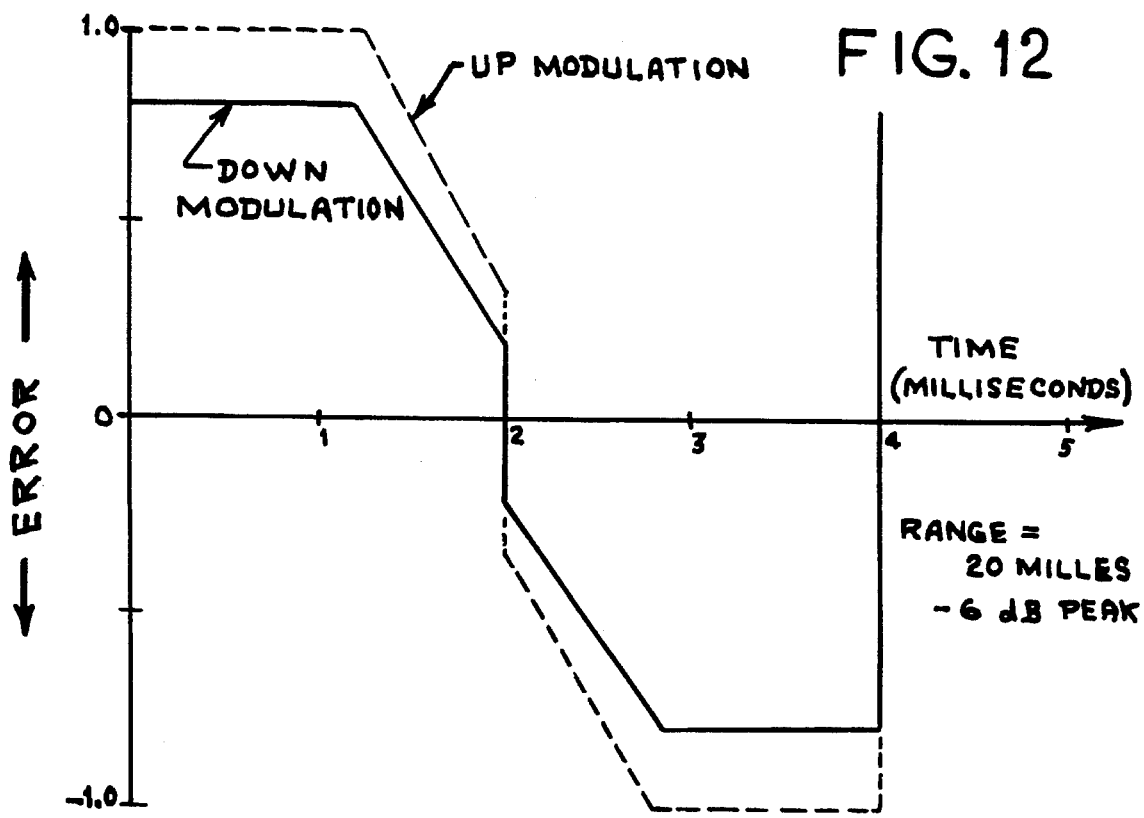
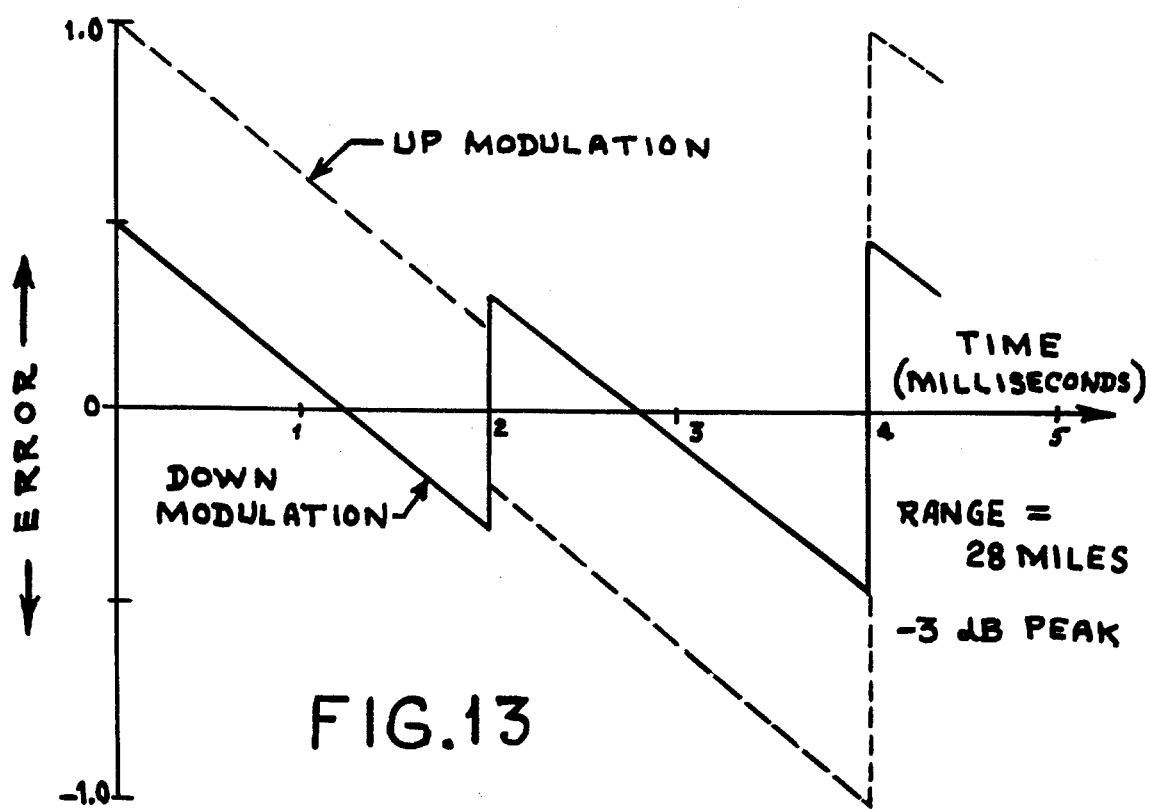

MAIN LOBE SHIFTING MEANS

STATEMENT OF GOVERNMENT INTEREST

The invention described herein may be manufactured and used by or for the Government for governmental purposes without the payment of any royalty thereon.

BACKGROUND OF THE INVENTION

This invention relates to electronic counter measures (ECM) systems and in particular to systems that utilize main lobe shifting techniques to jam track while scan (TWS) radar operation.

One present ECM technique is to use a swept repeater modulation (SRM) program. Such a system merely transmits a series of pulses at a given frequency. A certain number of the pulses will coincide with threat radar signals in such a way as to introduce an angle error in the return signal. SRM programs when used against TWS emmiters are forced to reduce effectiveness by sweeping over the scan rate uncertainty of the emitter type of interest. As an alternative, many systems rely on external receivers, such as the radar homing and warning systems (RHAW) to measure the appropriate scan rate of each radar encountered and thereby permit the SRM program to reduce the scan rate uncertainty range being swept. This procedure has been found to produce a marked improvement in jamming effectiveness. The cost and complexity of the required signal processing equipment for RHAWs is often prohibitive, however. Another approach which has often been considered as an alternative to the SRW program is the main lobe shifting technique. The inherent advantage of this approach is that there exist no frequency or scan rate uncertainty in that each main lobe received is operated upon independently. In theory this should provide the main lobe shifting technique with a performance far exceeding that achieved with present SRM programs. However, in practice this has not always been the case and as a result main lobe shifting is not a widely used technique in todays ECM equipment. One problem that can be encountered is that initial detection of the received signal can occur anywhere on the main lobe or even on a side lobe. The conventional approach is to use log video amplifiers in an attempt to overcome this problem by locating the peak of the beam in order to properly position the up modulation interval. This however, is a difficult task which can be influenced by fluctuations in received power. A second problem of the conventional approach is that it is not effective against lobe on receive only (LORO) radar operation or other constant illuminator emmiter sources since discrete lobes cannot be detected. Further, it may even cease to be effective against TWS sources when in the presence of a constant illuminator.

It is apparent from the foregoing discussion that there currently exists the need for an improved ECM technique and implementation means that is effective in jamming all types of threat radar operation and that overcomes the scan rate frequency and phase uncertainties common to currently used techniques. The present invention is directed toward satisfying that need.

SUMMARY OF THE INVENTION

The invention is an improved main lobe shifting technique and implementation means that overcomes the many problems associated with conventional lobe shifting techniques that attempt to locate the peak of the beam by measuring received power. The technique is implemented by using a modulated sweep program to cover the limited time or phase uncertainty resulting from antenna pattern roll-off and, to a lesser degree, scan rate uncertainty.

The modulation sweep program has a given modulation cycle time and comprises a multiplicity of sweep waveforms, the parameters of which are selected to match threat radar antenna pattern and angle tracking gate positions. The circuit that generates the modulation sweep program is actuated by the ECM system threshold detector and functions only if the detected radar signals arrive at times equal to or greater than a preselected interval. For constant illumination or saturated TWS radar signal conditions the circuit is locked out and a conventional SRM program is used.

It is a principal object of the invention to provide new and improved means for effecting main lobe shifting in electronic countermeasure systems.

It is another object of the invention to provide for use in an ECM system, an improved modulation sweep program that is not subject to scan rate frequency and phase uncertainties.

It is another object of the invention to provide, for use in an ECM system, an improved main lobe shifting technique and implementation means that significantly improves jamming effectiveness against TWS emitter.

It is another object of the invention to provide, for use in an ECM system, an improved modulation sweep program that is used in conjunction with a conventional SRM program whereby both constant illumination emitters and TWS radars are effectively jammed.

It is another object of the invention to provide new and improved means for effecting main lobe shifting in ECM system that is inexpensive and does not require complex signal processing circuitry.

These, together with other objects, features and advantages of the invention will become more readily apparent from the following detailed description when taken in conjunction with the illustrative embodiment of the accompanying drawings.

DESCRIPTION OF THE DRAWINGS

FIG. 12 is an error waveform for a 3.5 to 5.5 ms sweep at a range of 20.0 miles;

FIG. 13 is an error waveform for a 3.5 to 5.5 ms sweep at a range of 28.0 miles;

DETAILED DESCRIPTION OF THE PREFERRED EMBODIMENT

Figure 1:
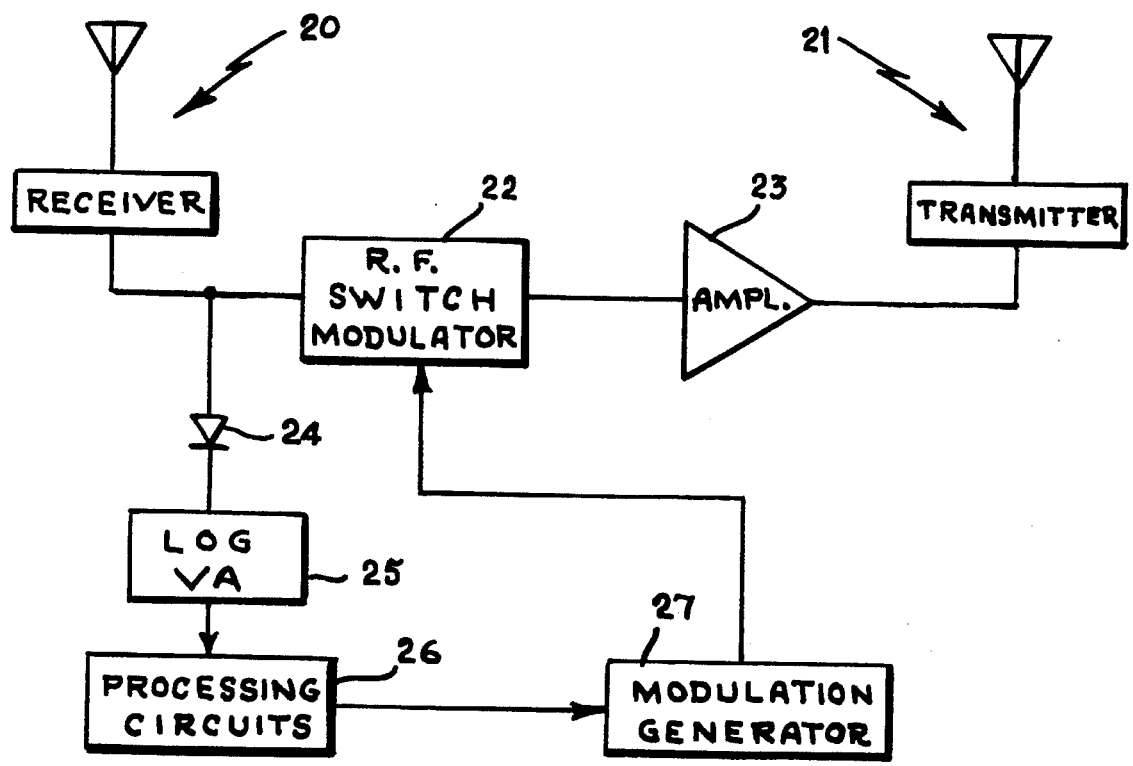
FIG. 1 is a block diagram illustrating a prior art ECM main lobe shifting technique.
Figure 2:
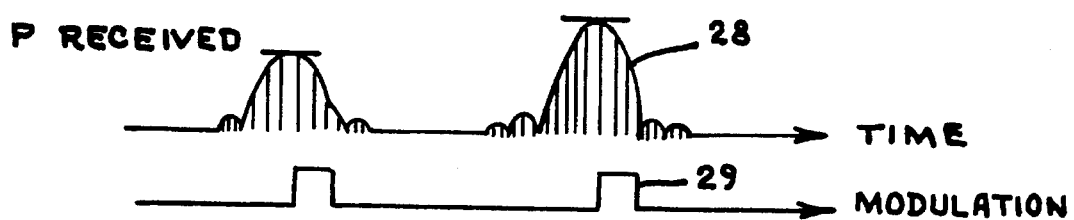
FIG. 2 illustrates waveforms assocated with the main lobe shifting technique of FIG. 1.

The conventional approach to ECM system jamming of TWS threat radars is illustrated by FIGS. 1 and 2. The ECM system includes receiver means 20, transmitter means 21, RF switch modulator 22, amplifier 23 and modulation generator 27. The received antenna wave forms 28 are modulated by an SRM program 29 prior to being transmitted back to the threat radar. When a free running pulse train of pulses 29 is used the modulation only randomly introduces angle error into the retransmitted antenna waveform. In order to improve this condition the prior art approach has been to use additional circuitry including diode 24, log video amplifier 26 and processing circuitry 26. This circuitry locates the modulation pulses in appropriate position relative to the received signal and greatly improves performance. As indicated above this approach requires complex signal processing circuits and is very costly.

Figure 3:
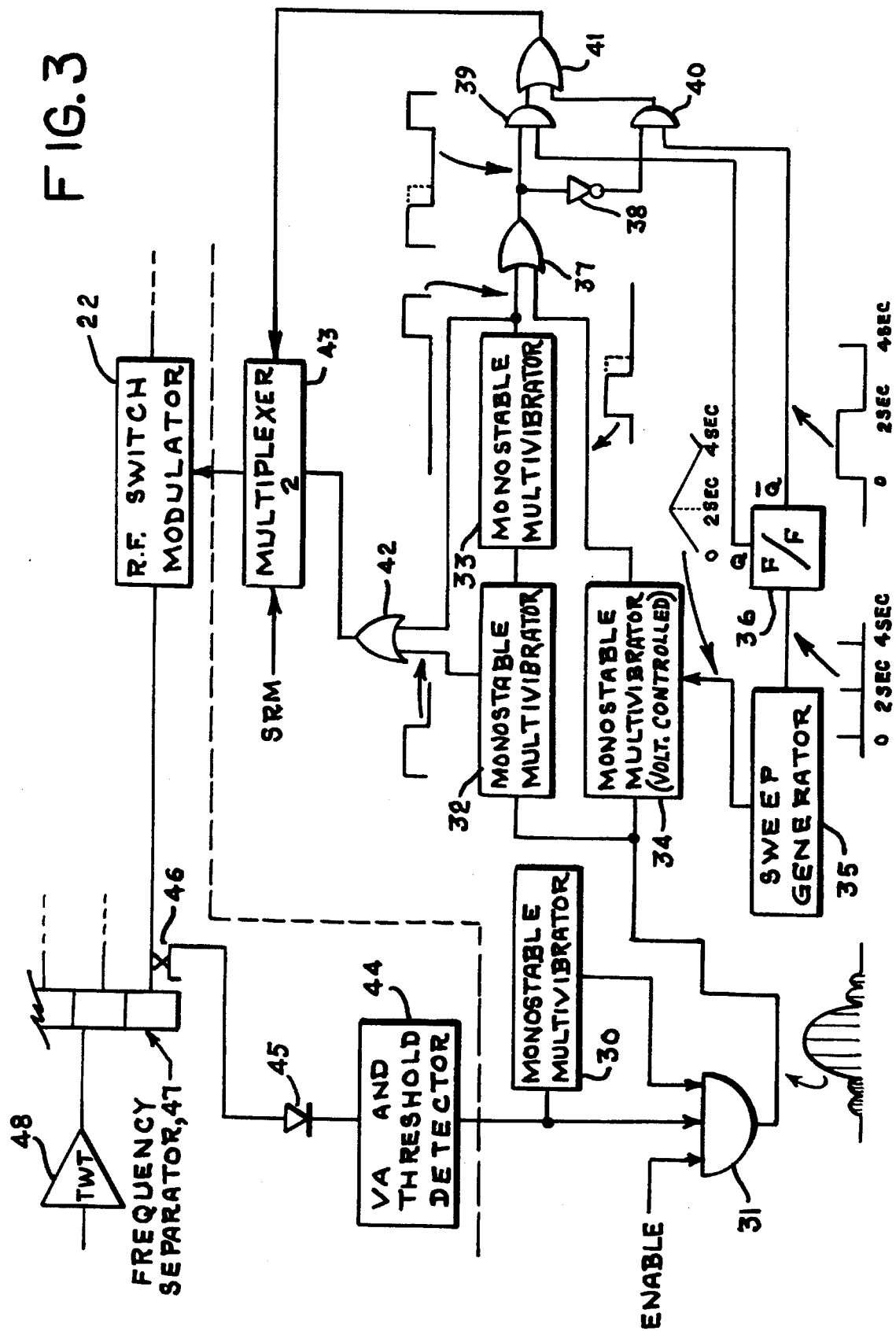
FIG. 3 is a schematic diagram of one implementation of the improved main lobe shifting technique of the present invention.

The Improved Main Lobe Shifting Technique of the invention shown functionally in FIG. 3, is designed to overcome the problems of the conventional approach described above while maintaining a low level of complexity. These problems include the inability to handle LORO or other constant illuminator sources plus the difficulty of properly positioning applied modulation as a result of antenna pattern roll-off. Further, the improved technique of the invention does not require log video amplifiers but rather is designed for use in existing ECM systems having frequency channelized RF switch modulators and simple crystal video detectors (shown above dotted line in FIG. 3).

Referring now to FIG. 3 the implementation of the invention disclosed thereby comprises monostable multivibrators 30, 32, 33, 34, AND gates 31, 39, 40 OR gates 37, 41, 42, sweep generator 35, flip flop 36 and multiplexer 43. Amplifier 48, frequency separator 47, diode 45, threshold detector 44 and RF modulator 22 are components of the ECM system. For the particular case hereinafter described monostable multivibrator 30 times out at 10 milliseconds, monostable multivibrator 32 times out of 10.5 milliseconds, monostable multivibrator 33 times out at 3 milliseconds and monostable multivibrator 34 is voltage controlled and is set at 3.5–5.5 milliseconds.

The circuitry of FIG. 3 operates in the following fashion. The resettable multivibrator 30 connected to the threshold detector 44 output serves to prevent the succeeding main lobe circuitry from operating on a detected pulse if a previous detection has occured in the last 10 milliseconds. In the Improved Main Lobe Switching Technique of FIG. 3, a conventional SRM program is always applied to the RF switch modulator 22 unless the program is interrupted by the detection of a new main lobe. Therefore, if a LORO signal should be received or the density of TWS signals becomes too great, the multivibrator 30 will always be set and the technique will automatically revert to the conventional SRM program. If the multivibrator 30 is not set, then a detected pulse will be allowed to pass through the AND gate 31 (if enabled by external controller) and to trigger the main lobe shifting circuitry. The primary purpose of this circuitry is to generate the typical sweep modulation program shown in FIG. 4. It should be noted that many possible implementations are possible and that FIG. 3 does not represent the most efficient. Rather, FIG. 3 is the easiest to understand and functionally represents the operations being performed.

Figure 4:
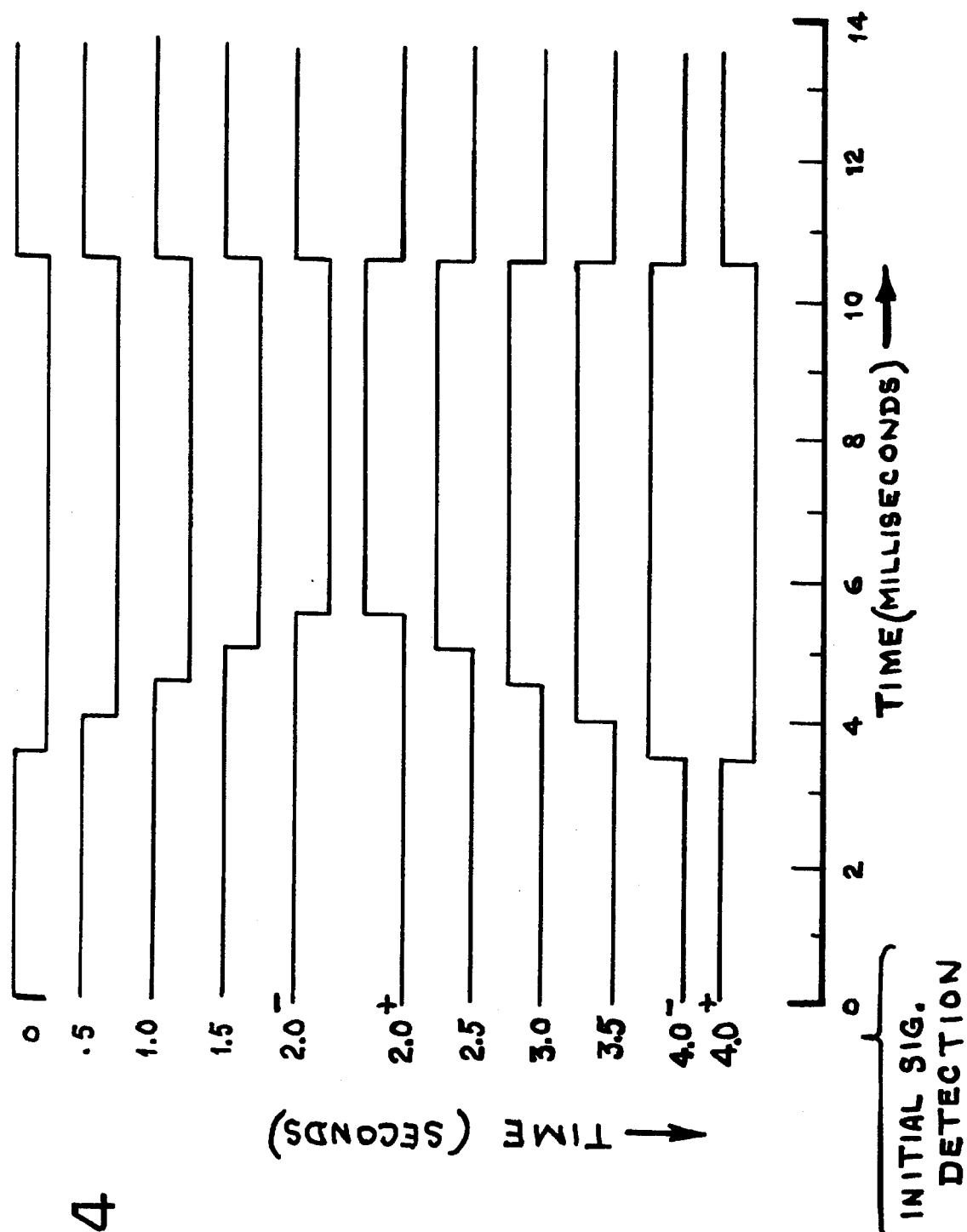
FIG. 4 illustrates the sweep modulation program waveform generated by the implementation of FIG. 3.

The sweep modulation program of FIG. 4 is designed to overcome the antenna pattern roll-off problem without resorting to the peak power measurements of the conventional approach. The parameters of this program were selected to match the typical antenna pattern 49 and angle tracking gate positions 50, 51 shown in FIG. 5. This antenna pattern, 49 while representative, does have relatively high side lobe levels (only 22 dB down) which, to some degree, limits the effectiveness of the Improved Main Lobe Shifting Technique. However, the choice of antenna pattern is chosen to present a worse case example.

The basis for selecting the sweep waveform parameter values is as follows. The 13.5 millisecond interval is selected to match the time between the desired minimum side lobe detection point to the end of the right angle gate 50 (detection at −9.5 ms to end of gate at 3.75 ms). The 10.5 millisecond interval is selected to approximately match the interval between the minimum main lobe detection point (−6.5 ms) to the end of the right angle gate 50 (+3.75 ms). The 5.5 millisecond interval represents the maximum modulation interval required to insure that for the main lobe that the left angle gate 51 is always completely covered (detection at −6.5 ms with left gate ending at −1.15 ms). The 3.5 millisecond interval is selected to optimize performance at the 3 db beamwidth point by insuring that only the left gate 51 is impacted by initial modulation (detection at −2.5 ms to leading edge of right gate at 1.25 ms). The 4 second modulation cycle time of the program is an arbitrary time interval.

The crystal video detectors of ECM systems are typically preflight adjusted to detect an emitter of interest at approximately 1.5 times its lethal range. In the representative example of FIG. 5 it is assumed that the detector is adjusted to detect signals greater than −10 dBm and that this corresponds to a detection range at the 3 dB beamwidth points of about 28 miles (a lethal range of about 20 miles). Typically, a TWS emitter represents a lethal threat when the range between the aircraft and the site is greater than about 3 miles. Therefore, in the representative example given the range over which the main Lobe switching technique must be effective is from 3 to 20 miles. However, it should be recoginzed that due to emitter radiated power and system receive antenna gain uncertainties that in some applications there may exist a total threshold setting uncertainty on the order of 6 to 10 dB.

Figure 5:
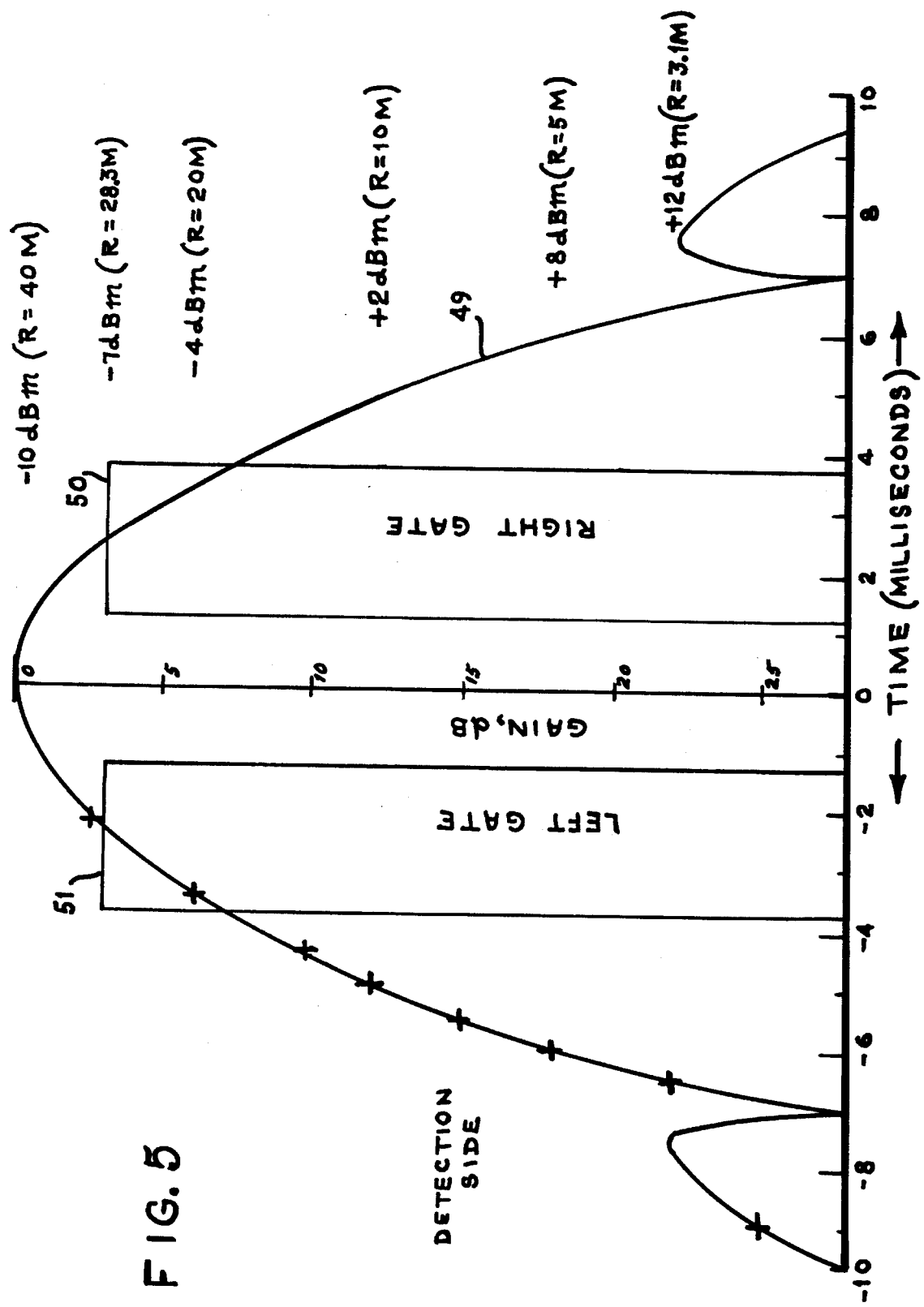
FIG. 5 is a graph of a typical emitter antenna pattern.
Figure 6:
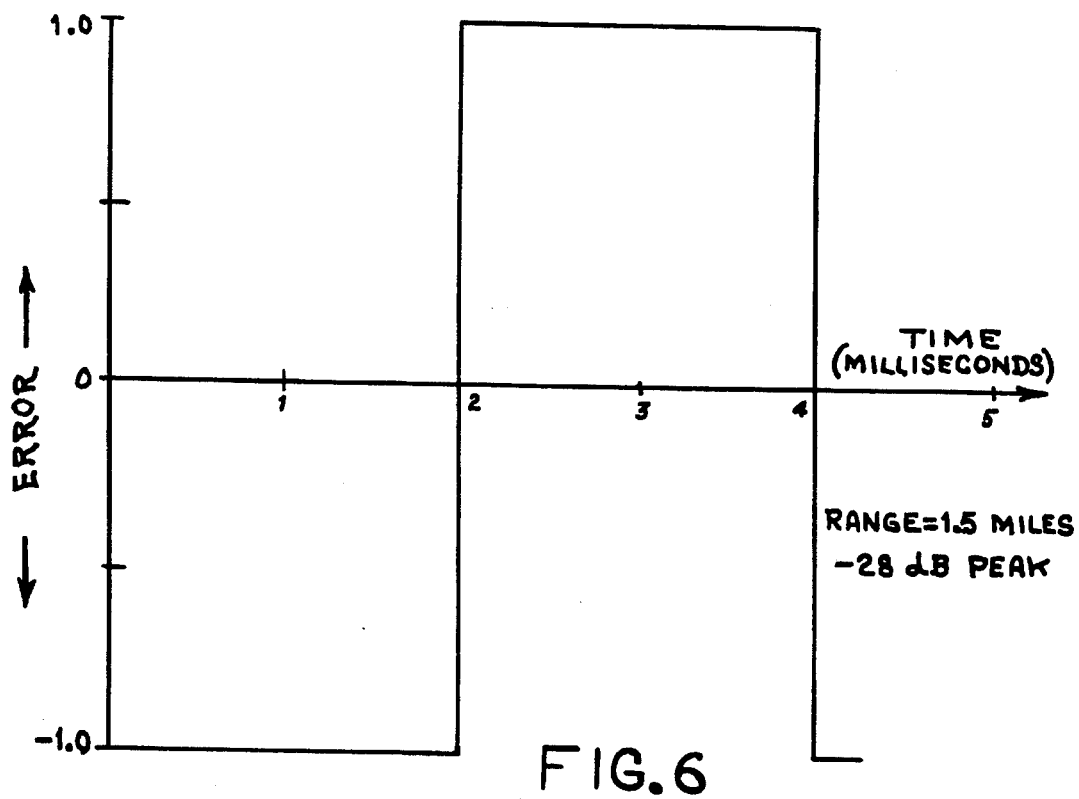
FIG. 6 is an error waveform for a 3.5 to 5.5 ms sweep at a range of 1.5 miles.
Figure 7:
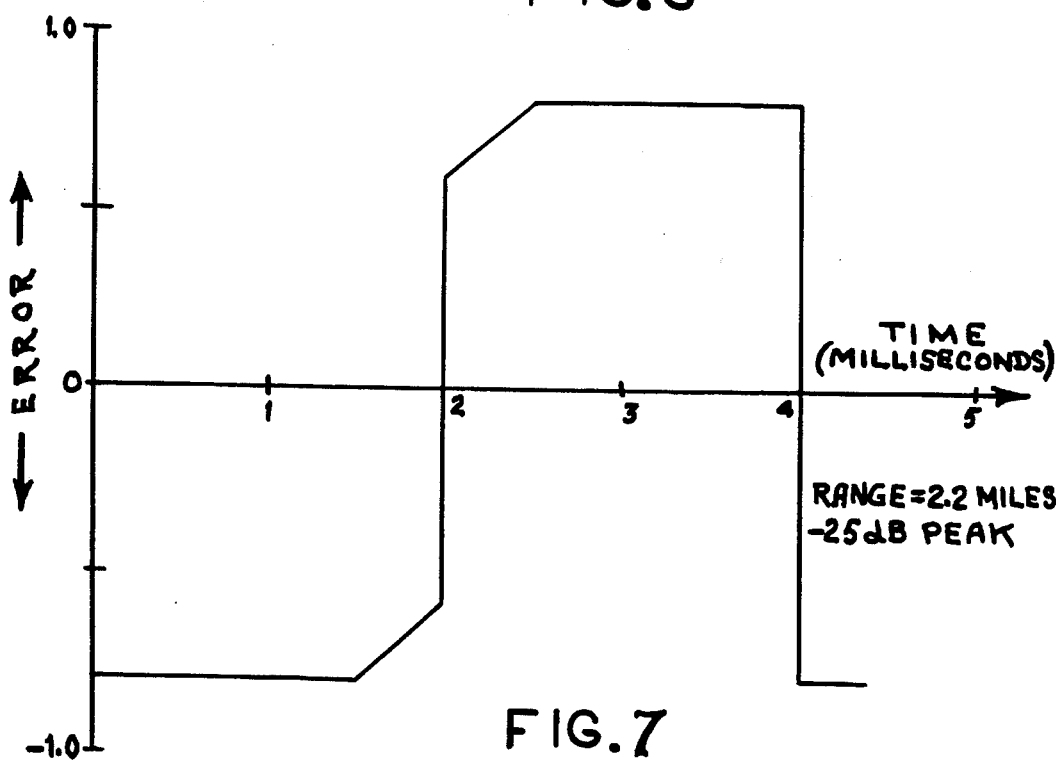
FIG. 7 is an error waveform for a 3.5 to 5.5 ms sweep at a range of 2.2 miles.
Figure 8:
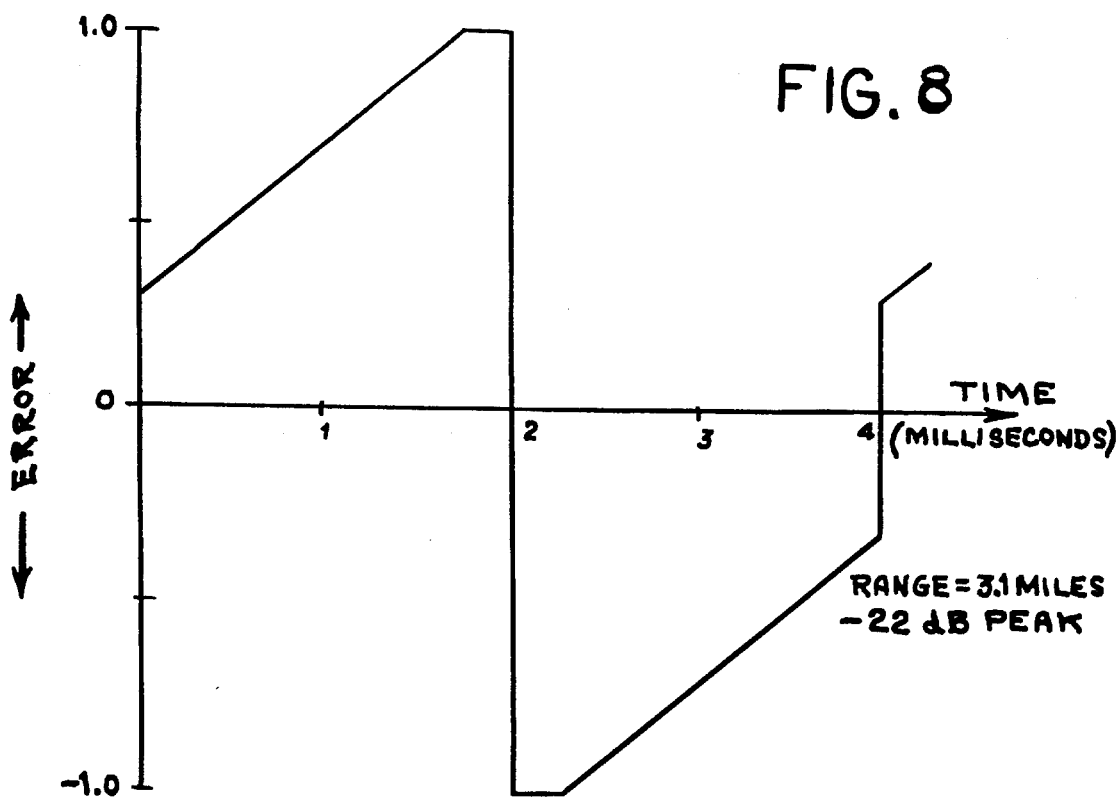
FIG. 8 is an error waveform for a 3.5 to 5.5 ms sweep at a range of 3.1 miles.
Figure 9:
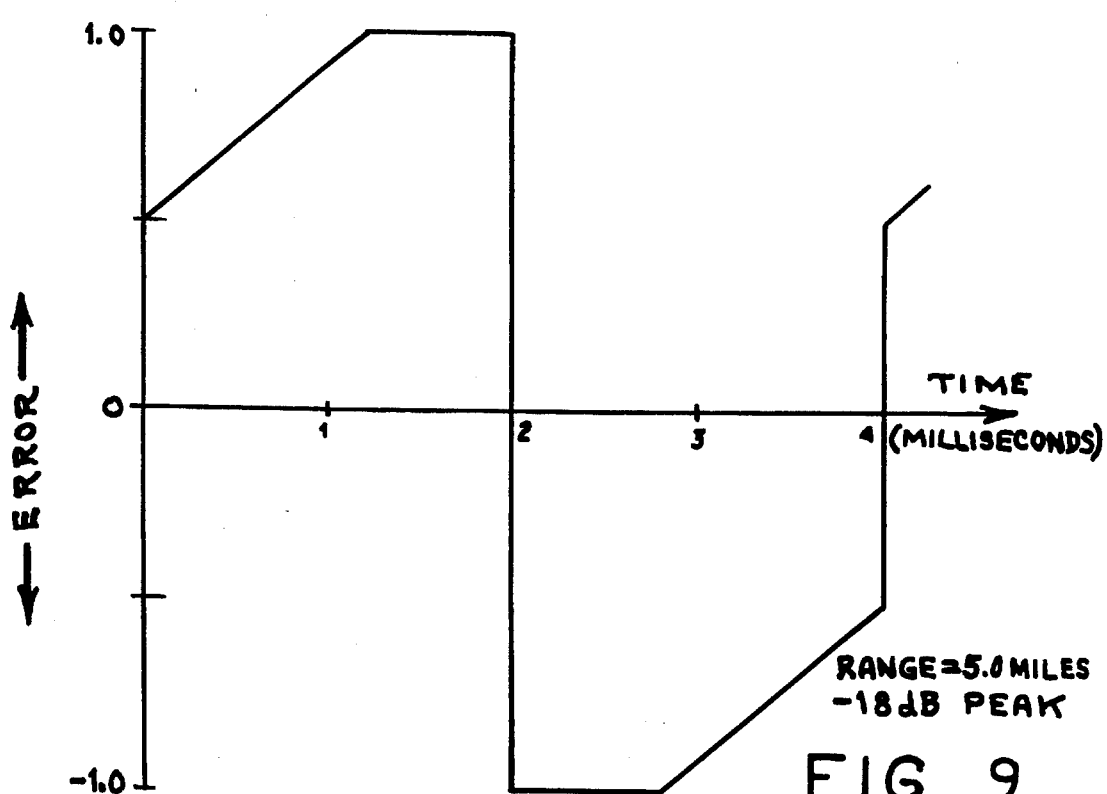
FIG. 9 is an error waveform for a 3.5 to 5.5 ms sweep at a range of 5.0 miles.
Figure 14:
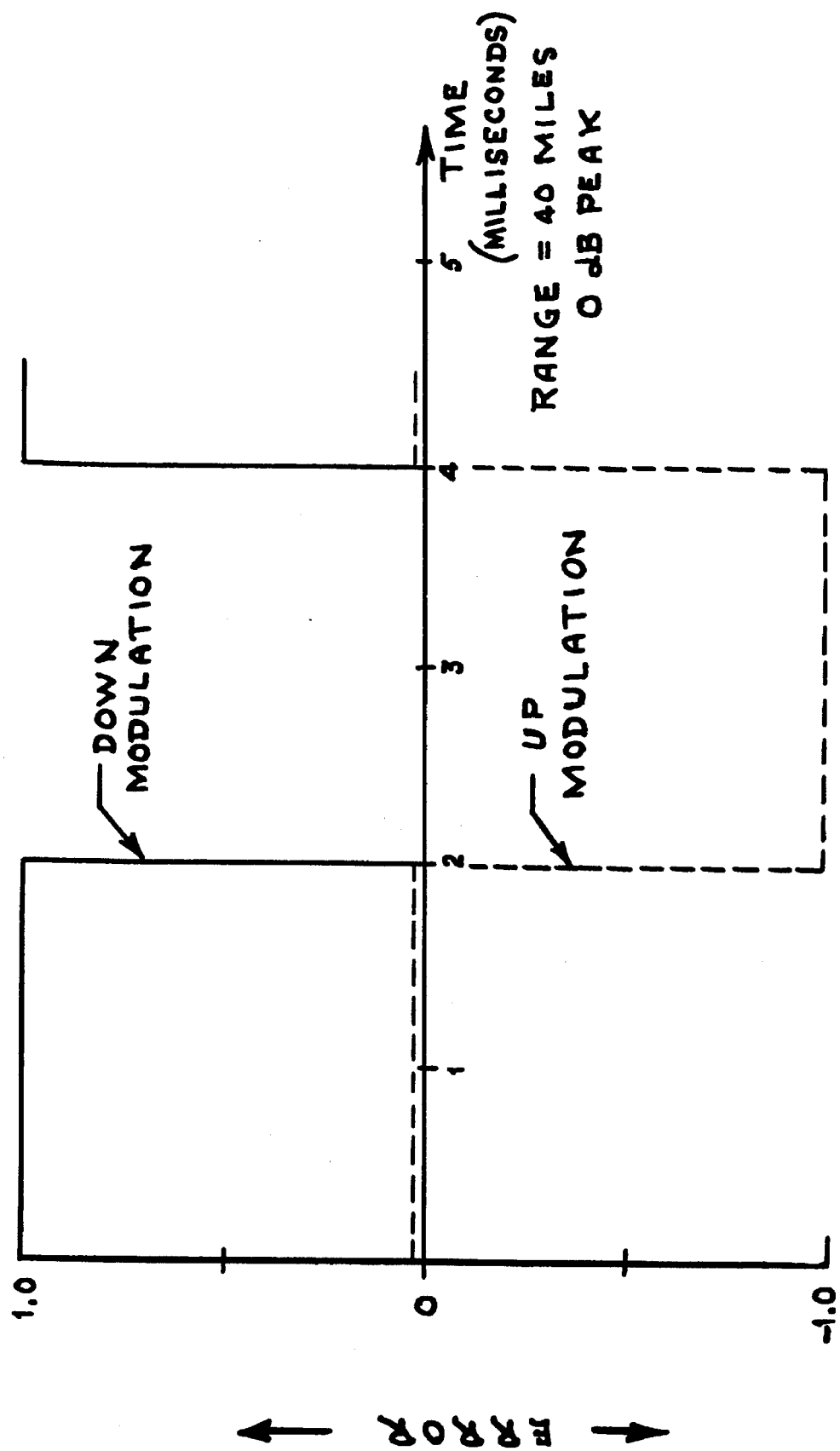
FIG. 14 is an error waveform for a 3.5 to 5.5 ms sweep at a range of 40.0 miles; and, FIG. 15 is a plot computed from FIGS. 6 through 14 of the average percent of optimum error versus the location on the antenna pattern.

The expected performance of the Improved Main Lobe Shifting Technique on a TWS receiver can readily be determined by observing the impact of the typical sweep program of FIG. 4 on the angle gate outputs of FIG. 5. To illustrate, consider the performance achieved when operating at a fixed range of 3.15 miles (−6.5 MS in FIG. 4). At 0 seconds in the sweep program the up modulation interval covers only about 30 percent of the left gate with the down modulation interval covering the entire right gate. As the sweep program continues the percentage of the left gate covered by the up modulation interval increases until at about 1.9 seconds into the program the entire left gate is covered by the up modulation interval and the entire right gate is covered by the down modulation interval. At this point maximum error indicating target to the left is being introduced into the radars angle tracking loop. At 2 seconds plus the polarity of the modulation is deliberately reversed causing the left gate to be entirely covered by a down modulation interval and the right angle gate to be entirely covered by an up modulation interval. A maximum error is now being introduced that indicates target to the right. A curve illustrating this operation and the performance expected at the range of 3.1 miles is shown in FIG. 8. A "+1" is used to indicate maximum induced left error while a "−1" is used to denote maximum right error. The expected performance at ranges of from 1.5 to 40 miles are presented in FIGS. 6 through 14. It should be noted that at ranges of 20 miles and greater that the performance achieved becomes in part a function of the SRM modulation state prior to making initial signal detection. To illustrate, at a range of 20 miles the left angle gate is opened before main lobe detection was even made. Therefore, it is not possible for the initial up modulation interval to completely cover the left angle gate unless the SRM program was up modulating prior to detecting the main lobes presence. For this reason the curves shown in FIGS. 12, 13, and 14 show a range of results which are a function of the SRM program state.

Figure 10:
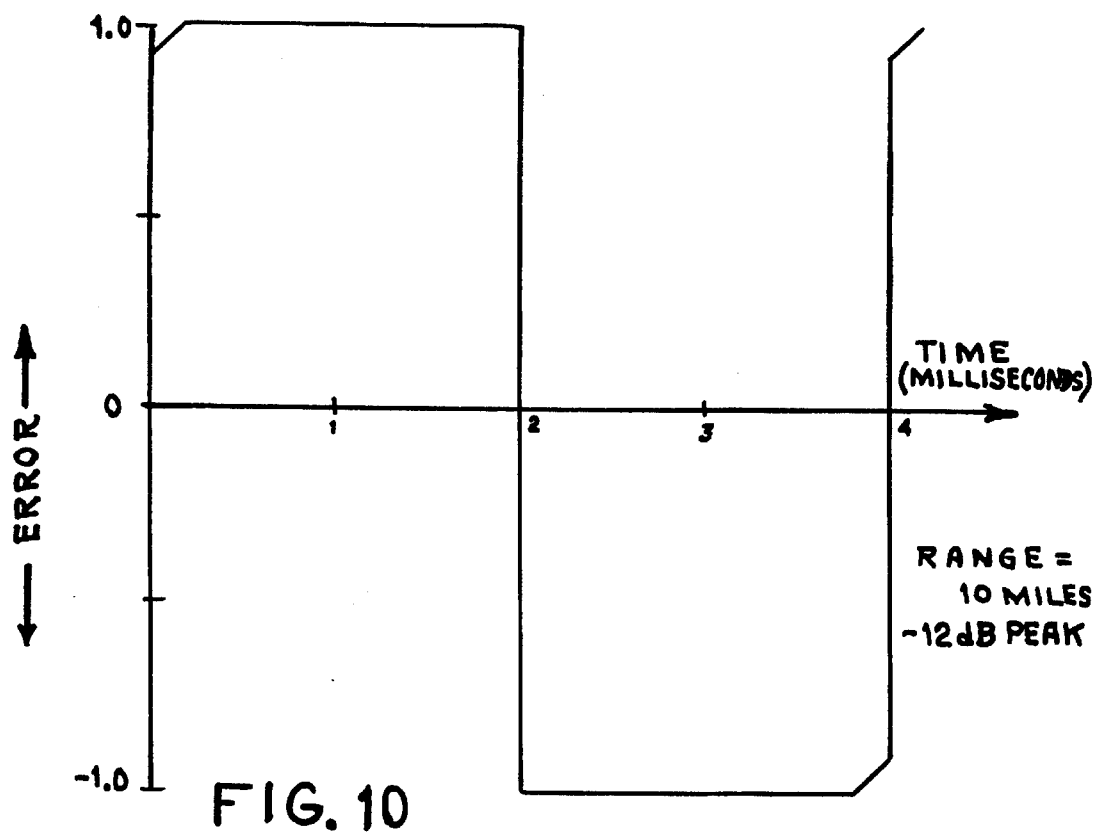
FIG. 10 is an error waveform for a 3.5 to 5.5 ms sweep at a range of 10.0 miles.
Figure 11:
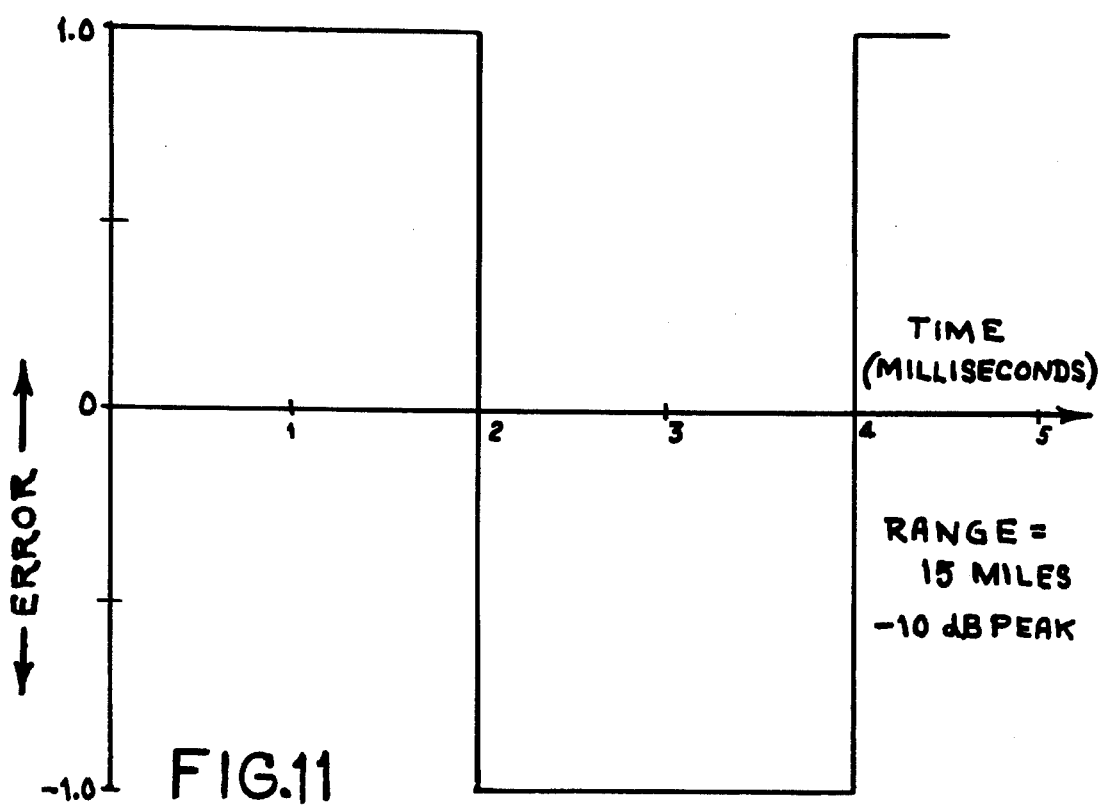
FIG. 11 is an error waveform for a 3.5 to 5.5 ms sweep at a ranging 15.0 miles.
Figure 15:
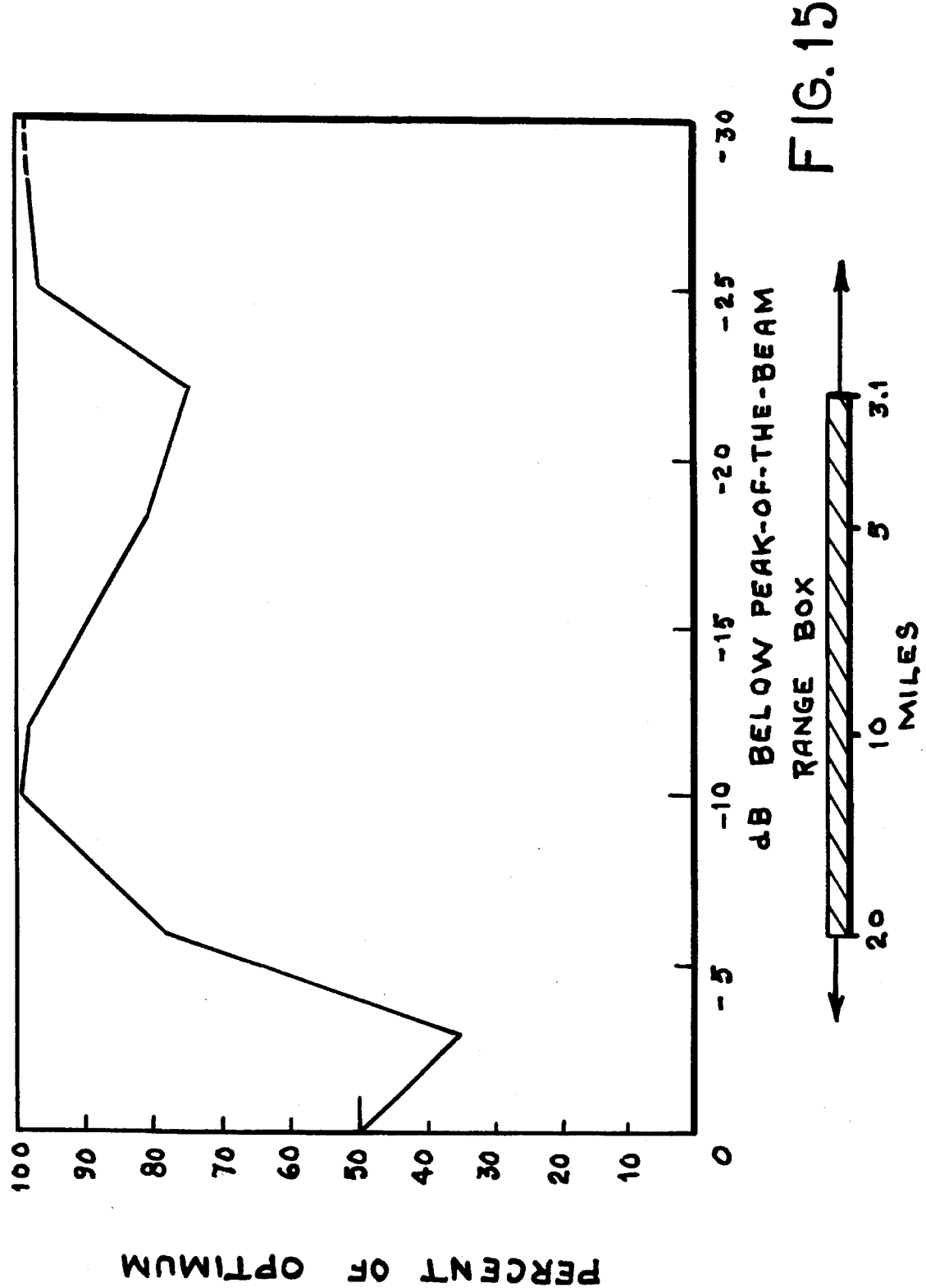

A comparison of FIGS. 5 through 13 reveals that the maximum possible peak error is achieved at ranges extending from 1.5 to almost 20 miles (approximately a 20 dB range) with maximum peak errors achieved from 20 to 40 miles as a function of the SRM modulation state prior to initial detection. However, perhaps a better figure-of-merit is the percentage average error introduced into each gate as compared to the optimum that can be achieved. FIGS. 5 and 10 are representative of optimum performance. Namely, the entire left gate is being down modulated while the entire right gate is being up modulated or vice versa over the entire sweep program. A plot computed from FIGS. 6 through 14 of the average percent of optimum error versus the location on the antenna pattern is shown in FIG. 15. This plot shows that greater than 75 percent of optimum performance is achieved from 6 dB below the peak to 28 dB below the peak. It should be noted that the technique will continue to operate satisfactorily beyond the 28 dB down point as inticated by the dashed portion of the plot. At the bottom of FIG. 14 is shown a box representing the 3 to 20 mile range of interest. In the example previously given the box was positioned as shown. However, if an error is made in setting the detection sensitivity level then the box may move to either the right or left. The plot shown in FIG. 5 indicates that the disclosed Main Lobe Shifting Technique will provide TWS jamming coverage over the 3 to 20 mile range even with a detection level uncertainty range of up to 12 dB or more.

The improved Main Lobe Shifting Technique and implantation of the inverter significantly improves the jamming effectiveness against TWS emitters over that which can be achieved with conventional SRM programs. In theory, since there is no scan rate frequency uncertainty and only a limited phase uncertainty, the performance should even exceed that of a receiver aided SRM program using scan rate measurements. Only sophisticated receivers that track the time position of an emitter's main lobe can in theory provide better performance than the Improved Main Lobe Shifting Technique. Unlike previous techniques, no attempt is made to measure received power. Rather, a standard crystal video detection system is used in combination with a sweep modulation program that covers the detection point uncertainty resulting primarily from antenna pattern roll-off. The dynamic range of the disclosed technique is such that precise adjustment of the detection sensitivity or threshold level is not mandatory. It is estimated that the Improved Main Lobe Shifting Technique can be implemented into an existing system with simple crystal video detectors and less than 10 IC's. Further, unlike the conventional approach, the improved technique provides coverage against LORO and other constant illuminators by automatically reverting to a conventional SRM program when in their presence.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. In an electronic countermeasure system that employs main lobe shifting techniques for shifting threat radar antenna patterns relative to the threat radar left and right angle tracking gate positions and that includes means for receiving threat radar signals, an RF switch modulator for modulating the received threat radar signals, means for transmitting signals modulated thereby and threshold detector means: the improvement residing in improved main lobe shifting means, said main lobe shifting means comprising:

a circuit for generating a sweep modulation program, said sweep modulation program having a given modulation cycle time and comprising a multiplicity of sweep waveforms the parameters thereof being selected to match threat radar antenna pattern and angle tracking gate positions, said circuit for generating a sweep modulation program being actuated in response to the output of said threshold detector means and the sweep waveforms generated thereby being applied to said RF switch modulator, wherein said sweep waveform parameters include: modulation intervals selected to match the time between the desired minimum side lobe detection point to the end of the threat radar right angle gate and to approximately match the interval between the minimum main lobe detection point to the end of the threat radar right angle gate, and modulation intervals that insure that for the main lobe that the threat radar left angle gate is always completely covered and that optimize performance at the db beamwidth point by insuring that only the threat radar left angle gate is impacted by initial modulators, wherein said circuit for generating a sweep modulation program includes first, second, and third AND gates, first, second and third OR gates, first, second, third and fourth monostable multivibrators, a sweep generator, a flip-flop, an inverter, and a multiplexer, said first monostable multivibrator connected between said threshold detector means and a first input of said first AND gate, said first AND gate having a second input connected to said threshold detector and a third input connected to receive an enable signal, said second monostable multivibrator receiving the output of said first AND gate and feeding said first OR gate and said third monostable multivibrator, said fourth monostable multivibrator being fed by the output of said first AND gate and the output of said sweep generator and feeding said second OR gate, said flip flop receiving the output of said sweep generator and feeding said second and third AND gates, said third monostable multivibrator feeding said first and second OR gates, said second OR gate feeding said inverter and said second AND gate, said third AND gate being fed by said inverter and feeding said third OR gate, said second AND gate feeding said third OR gate and said multiplexer receiving the outputs of said second and third OR gates and said swept repeater modulation program and feeding said RF switch modulator;

means for providing a swept repeater modulation program and said main lobe switching means effects implementation of said swept repeater modulation program in response to detected pulses that are received at less than said given time interval; and actuating means for actuating said circuit for generating a sweep modulation program only in response to detected pulses that are received at not less than a given time interval.

* * * * *